Patented Apr. 10, 1934

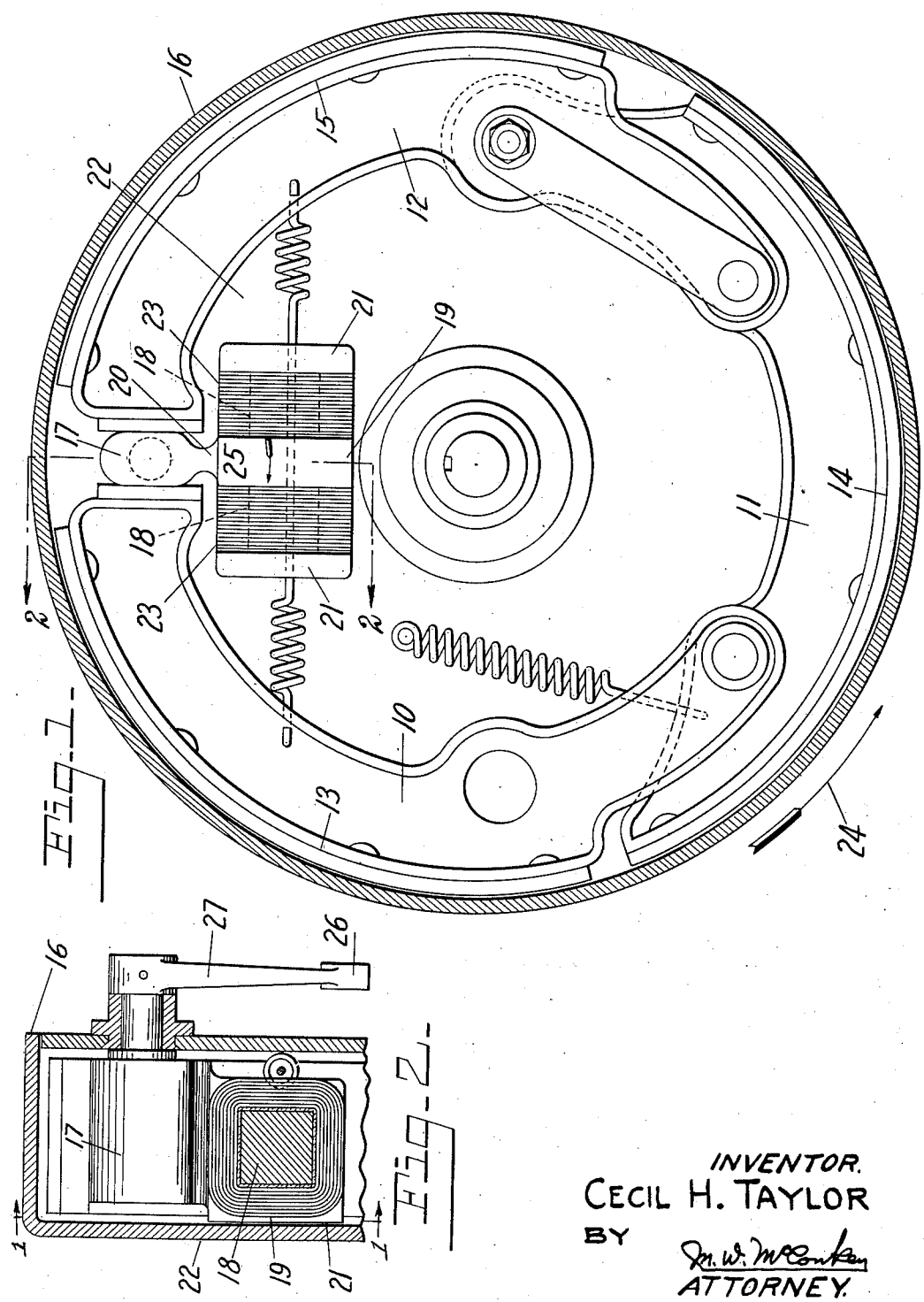

1,954,603

UNITED STATES PATENT OFFICE 1,954,603

MAGNETIC BRAKE

Cecil H. Taylor, South Bend, Ind., assignor to Bendix Brake Company, South Bend, Ind., a corporation of Illinois Application June 29, 1928, Serial No. 289,108

6 Claims. (Cl. 188—78)

My invention relates particularly to brakes of the servo type wherein the manual effort exerted to apply the brakes is constantly and proportionately augmented by suitable power effort, but the invention may also be used to apply brakes by magnetic effort alone.

The object of my invention is to provide a suitable electro-magnetically operated power means of such small dimensions that it may be readily contained in the unused space within standard brakes with substantially no alteration in their construction, to the end that the means now operable by manual effort alone may be assisted or entirely operated by said power means.

I attain this object by the structure shown in the accompanying drawing wherein—

Fig. 1 is a cross section taken on the line 1—1 of Fig. 2 and shows brake shoes of standard servo construction within a brake drum, together with the magnetic means which I employ to get additional servo action.

Fig. 2 is a partial cross section taken at 2—2 of Fig. 1.

Similar numerals refer to similar parts thruout the drawing.

In the drawing 10, 11 and 12 are the primary, secondary and auxiliary brake shoes respectively of a standard three-shoe type of Brake which has been selected for purposes of illustration only. The usual linings 13, 14 and 15 are interposed between the shoes and the rotating drum 16.

The working portion of cam 17 is of the contour regularly used in a brake of this kind, but to embody my invention an addition is made to the cam forging whereby it integrally comprises a spool having substantially square core portions 18, a middle flange 19 connected by neck 20 to the working portion 17, and two end flanges 21. The two end flanges 21 extend somewhat beyond the middle flange 19 and practically touch the wall 22 of the rotating brake drum 16.

Coils 23 of insulated wire surround core portions 18 and are connected to a suitably controlled electric current source, not shown, the controller being preferably of a type which varies the current in proportion to the manual braking effort applied. The controller, however, forms no part of the present invention.

When the brakes are to be operated by combined manual and magnetic means, coils 23 are energized simultaneously with the application of manual effort to cam 17. A magnetic circuit is established thru cores 18 and completed thru that portion of the wall 22 of the brake drum at the time adjacent and in close proximity to the ends of end flanges 21 whereby they are drawn tightly against the wall 22.

Now when drum 16 revolves in the direction of the arrow 24, the magnetic drag and the adhesion of end flange 21 to the wall 22 causes the magnetic element to be swung about the center of cam 17 in the direction of arrow 25, thus adding its effort to the manual effort which is already being applied to the end 26 of lever 27.

I am aware that prior to my invention electro-magnetic means have been employed to operate brake shoes, and I therefore do not claim such combination broadly; instead I claim—

1. The combination in an automotive brake of a rotatable brake drum, brake shoes within said drum, a cam adapted to engage said shoes and force them against said drum, an electro-magnet on said cam within said drum and adapted to operate said cam, and means for manually operating said cam.

2. An automotive brake having in combination, a brake drum, a backing plate to close the open side of said brake drum, brake shoes within said enclosure, a cam within said enclosure adapted to operate said shoes, an electro-magnet attached to said cam within said enclosure engaging the head of the drum and adapted to operate said cam, a shaft having bearing in said backing plate adapted to operate said cam, and manual means on said shaft outside of said enclosure to assist said electro-magnet.

3. Automotive brake mechanism of the class described, including, in combination, a rotatable brake drum having a head, expansible friction means having adjacent floating ends supported within said drum, a cam pivotally supported intermediate said adjacent ends and adapted to engage the same, manually operable means connected with said cam exteriorly of said drum to actuate the same, and magnetic means supported by said cam below and in overlapping relation to said adjacent ends, said magnet including a friction surface in close juxtaposition to said drum head.

4. Brake mechanism comprising, in combination, a rotatable drum, an expansible brake having separable ends arranged within the drum, a backing plate, an operating cam arranged between the ends of said brake and journalled on the backing plate, a part mechanically engaging the cam outside the backing plate to actuate the cam to spread the brake, and an electro-magnet depending from the cam within the drum and adapted to engage the head of the drum to actuate the cam to spread the brake.

5. Brake mechanism comprising, in combination, a rotatable drum, an expansible friction means having separable ends arranged within the drum, a backing plate, expanding mechanism arranged between the ends of said friction means and supported by the backing plate, a part mechanically engaging the expanding mechanism outside the backing plate to actuate the same for spreading the friction means, and an electromagnet associated with said expanding mechanism within the drum and adapted to engage the head of the drum to actuate the expanding mechanism to spread the friction means.

6. The combination in an automotive brake of a rotatable brake drum, friction means within the drum, an actuating member adapted to engage said friction means to force them against said drum, an electro-magnet operatively associated with said actuating member within said drum and including a part operable upon energization of said magnet to engage with the drum, and means positioned externally of said drum for manually operating said actuating member.

CECIL H. TAYLOR.